(12) United States Patent  
Stobbe et al.

(10) Patent No.: US 7,179,430 B1  
(45) Date of Patent: Feb. 20, 2007

(54) DIESEL EXHAUST GAS FILTER

(75) Inventors: Per Stobbe, Frederiksberg (DK); Jakob Weiland Hoi, Gentofte (DK)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/743,096

(22) PCT Filed: Jul. 7, 1999

(86) PCT No.: PCT/DK99/00390

§ 371 (c)(1),  
(2), (4) Date: Apr. 17, 2001

(87) PCT Pub. No.: WO00/01463

PCT Pub. Date: Jan. 13, 2000

(30) Foreign Application Priority Data

Jul. 7, 1998 (DK) ............................... 1998 00902

(51) Int. Cl.  
*B01D 50/00* (2006.01)

(52) U.S. Cl. ..................................... 422/180

(58) Field of Classification Search ............... 422/171, 422/177, 180; 55/523, DIG. 30; 60/301, 60/311  
See application file for complete search history.

(56) References Cited

U.S. PATENT DOCUMENTS

| 4,846,906 A | 7/1989 | Helferich et al. ............. 55/523 |
| 4,857,088 A | 8/1989 | Mizrah et al. ......... 55/DIG. 30 |

(Continued)

FOREIGN PATENT DOCUMENTS

EP     A336883     10/1989

(Continued)

OTHER PUBLICATIONS

Buchman, M. F. et al., "Regeneration Behavior of Light-Duty Catalytic Trap Oxidizer Systems," SAE (Society of Automotive Engineering) Technical Paper Series, Paper No. 840080, International Congress & Exposition, Detroit, Michigan, Feb. 27-Mar. 2, 1984, pp. 71-78.

(Continued)

*Primary Examiner*—Glenn Caldarola  
*Assistant Examiner*—Tom P. Duong  
(74) *Attorney, Agent, or Firm*—Kees van der Sterre

(57) ABSTRACT

A filter device for filtering soot particles from diesel engine exhaust gases comprises a casing, a shaped porous filter body, preferably of silicon carbide, SiC, such as a honeycomb structure wall flow filter body made from SiC particles. A membrane made from particles and/or fibres and having a smaller pore size than the filter body is applied on the gas outlet side surfaces of the filter body, and a catalytically active coating is applied on, and in the interior of, the filter body, e.g., on a wash coating. The design of the filter body with the small pore size membrane applied to outlet surfaces allows soot particles to travel into the interior of the filter which has relatively large pores and where they are removed by decomposition by contact with the catalyst deposited in the filter body. Due to the small pore size of the membrane on the outlet side, the filter is able to remove very small soot particles, and due to the large active area where an oxidation catalyst and the trapped soot interact, the temperature at which the soot is decomposed is relatively low.

14 Claims, 2 Drawing Sheets

U.S. PATENT DOCUMENTS 4,857,089 A * 8/1989 Kitagawa et al. .............. 55/523
4,912,076 A   3/1990 Mizrah et al. .............. 502/300
5,041,407 A * 8/1991 Williamson et al. ........ 502/303

FOREIGN PATENT DOCUMENTS

EP       A736503       10/1996
WO       WO 89/09648   10/1989

OTHER PUBLICATIONS

Mizrah, T. et al., "SELEE: Ceramic Foam for Pollution Reduction," ENVICERAM '88 Proceedings, Dec. 7-9, 1988, pp. 143-170.

* cited by examiner

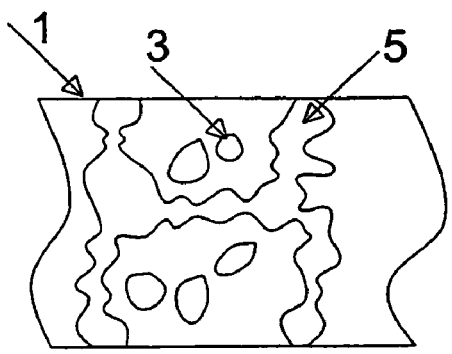
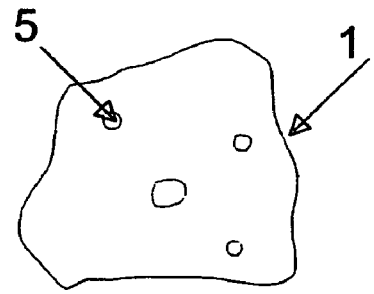
Fig. 1A
(Prior Art)
Fig. 1B
(Prior Art)
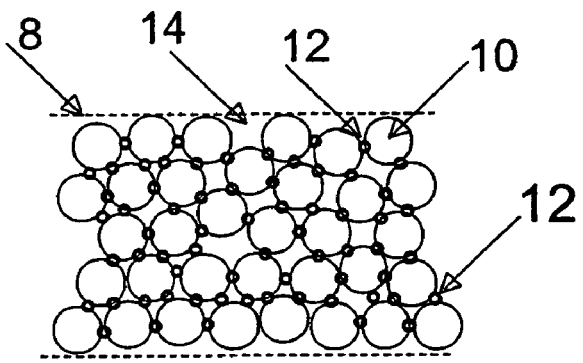
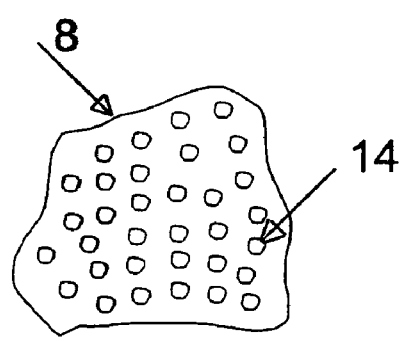
Fig. 2A
(Prior Art)
Fig. 2B
(Prior Art)
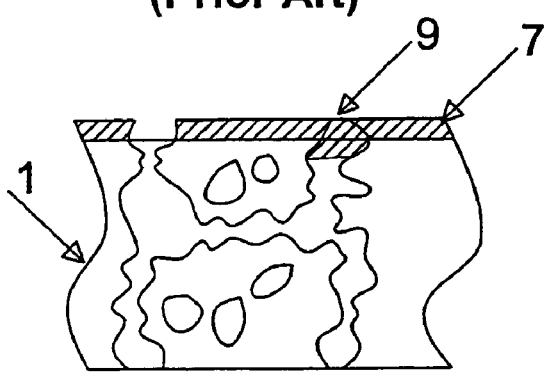
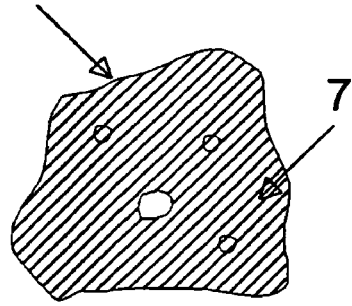
Fig. 3
(Prior Art)

DIESEL EXHAUST GAS FILTER

This application is the national phase under 35 U.S.C. § 371 of PCT International Application No. PCT/DK99/00390 which has an International filing date of Jul. 7, 1999, which designated the United States of America.

The present invention concerns improved filters for flue gas filtration.

The diesel engine emits large quantities of carbon particles known to be hazardous to human beings. Filtration of such particles is often performed using one-piece ("monolithic") substrates, so called Wall Flow Filters (WFF). A number of types of WFF are manufactured in a ceramic material called Cordierite by the company Corning Glass Works Inc. A WFF made of a material which had been found especially suited for use in this type of filter, SiC, is disclosed in International Patent Application publication No. WO 89/09648.

Soot filters are also manufactured as a relatively thick-walled pipe structure, from pressed metal wire, by Johnson Matthey Ltd., or ceramic wire mesh or, from foam ceramic structures manufactured by Alusuisse AG. Most of the known methods result in relatively low soot filtration efficiencies and significant soot blow-off, further reducing the filtration efficiency.

Accumulated particulate matter from a diesel engine will react with oxygen when exposed to temperatures higher than 550° C. in air with 21 per cent of oxygen. With decreasing oxygen concentrations, higher temperatures are required.

Due to the high efficiency of diesel engines, exhaust gas temperatures seldom exceed 400° C. in heavy-duty engines, and particles therefore build up in the exhaust gas filter and block the filter in a relatively short time, often after only a few hours.

Regeneration of flue gas filters is often accomplished by a few rather complicated techniques typically employing external heat supplies and where the whole filter structure, including the particulate matter, is heated with external energy from an oil burner or an electrical heating apparatus.

All known regeneration systems known are rather complicated, expensive and, being so complex, prone to technical failure. Thus, it is highly desired to obtain filters which are able to be regenerated at temperatures as low as possible to avoid complicated control systems for monitoring the regeneration, as well as to reduce the large energy loss incurred when heating a filter body to in excess of e.g. 500° C.

Precious metals such as platinum and palladium are known to oxidize organic gases and organic matter at relatively low temperatures; carbon monoxide may be oxidized at temperatures as low as 200° C. in situations where the carbon monoxide interacts with a large surface area of the precious metal.

Diesel soot filter regeneration temperatures not lower than 400° C. have been reached on Corning EX-47 or EX-66 Wall Flow Filters, using either a platinum or a vanadium pentoxide coating. These active coatings known per se are supplied to the actual surface of the body and do not penetrate deeply into the porous structure thereof.

Degussa AG has tested several coatings and have undertaken field trials showing that a vanadium pentoxide coating can reduce the regeneration temperature by a reasonable margin. In fact, regeneration temperatures in the order of 350° C. have been achieved when applying a surface-increasing coating and a catalytically active substance on a large surface metal wire mesh filter body. This is described by M. F. Buchman and B. E. Enga from Johnson Matthey, Inc. in SAE (Society of Automotive Engineering) paper number 840080 with the title: "Regeneration Behavior af Light-Duty Catalytic Trap Oxidizer Systems".

It has been tried to deposit a surface-increasing coating on the filter wall in order to increase the area in which the gas or soot interacts with the catalytically active coating. This coating may be in the form of a so-called wash coat which is deposited by "washing" a solution or slurry containing the catalytically active substance through the filter body in order for some of the substance to deposit on the filter wall. However, the relatively large amounts of wash coat necessary have been a problem as they tend to close the filter.

If a surface-increasing coating is used in connection with a catalytically active coating, the thickness of the coating will in general be so large that a porous material having a pore size of 15–25 µm would have a significantly reduced pore size after the deposition of these two coatings. Thus, it is not recommendable to use this technique on filters having an initial pore size lower than e.g. 25 µm.

Therefore, the only method for use of a surface-increasing coating on substrates having a pore size in this range has been on catalytic carriers, where the porosity of the substrate is not utilized for filtration.

The catalytic conversion of hazardous exhaust gases is strongly dependent upon the contract time. For a given gas flow rate, the contact time will be increased when the contact area is increased, thus giving a higher conversion rate. Thus, the catalytic activity of an applied catalyst towards particulate matter is also strongly dependent on the contact area. For a given soot load, a larger contact area will reduce the overall layer thickness of the deposited soot, and the time required for complete regeneration—soot burn off—will thus be reduced. Furthermore, a reduced layer thickness of the soot will increase the rate of regeneration at low temperatures since the soot burns when in contact with the catalyst on and inside the filter wall.

Hitherto, incomplete regeneration of filter bodies has been a problem for wall flow filters. This incomplete regeneration will leave soot in the filter so that the time between two consecutive regenerations is reduced.

As described above, the preferred method of regenerating a filter on a vehicle is to have the regeneration take place at relatively low temperatures, which will eliminate the need for expensive and sophisticated external hardware to heat up the filter and control the process. This is furthermore advantageous with respect to safety of the vehicles. It is not preferred to have a hot piece of ceramics or metal in the remains of e.g. a crashed car where fuel may be leaking from the tank. In addition, it is not preferred to have a very hot filter enclosure positioned under a car driving or parking in e.g. long grass, as this grass may be ignited by the filter enclosure. Thus, the lower the temperature of the filter body, the safer the vehicle altogether.

Investigations have shown that it is possible to obtain considerably lower regeneration temperatures by increasing the surface contact area between the active coating and the soot.

Mizrah, T., Gabathuler, J.-P., Gauckler, L., Baiker, A., Padeste, L. & Meyer, H. P ("SELEE: Ceramic Foam for Pollution Reduction", ENVICERAM '88 Proceedings, 7.–9. December 1988) compared the soot ignition temperature for ceramic foam filters and Wall Flow Filters. The ceramic foam filter is a depth filter with rather low trapping efficiency (58 to 67%) compared to approximately 90% for the WFF.

The larger surface area of the coated foam filter, compared to the coated WFF, reduces the soot ignition temperature further by 25° C. and by 200° C. for the non-coated WFF.

The catalytic coatings tested were Degussa D313 and D345 on Corning WFF. No surface-increasing coating was applied.

It has been found by the present inventors that in a filter of the type described in WO 89/09648, part of the filtered soot is actually trapped at a small distance into the filter wall of the filter body. In a filter body of this type having a mean pore size of 30–200 µm, soot may be deposited in a depth of up to in the order of from minus 200 µm (on top of the filter) to plus 1000 µm (inside the filtering wall).

This finding has contributed to the inspiration resulting in the present invention. According to the invention, the soot particles are allowed to travel into the interior of the filter, such as into the interior of the filtering wall of the WFF, where they are removed by decomposition by contact with a suitable catalyst which has been deposited in the interior of the filter. The volume actually holding the soot is thus dramatically increased, as also at least parts of the inner surface of the filter body hold the soot. Thus, according to the invention, the catalytically active substance is deposited not only on the outer surface of the filtering wall, but also on the internal surface of the filter body wall, whereby the active area of the surface on which the catalytically active substance and the trapped soot interact is increased, resulting in a decreased regeneration temperature of the soot on the filter body when the catalytically active coating is an oxidizing coating.

The inner surface of the filter body is defined by the walls of the paths used by the gas to travel through the filter body. In the filter body described in WO 89/09648, this inner surface is constituted by the surfaces of the particles constituting the filter body.

The inner surface of the filter body may be further increased by depositing a surface-increasing coating, such as a so-called wash-coat, on the surface, including the inner surface, of the filter body prior to the deposition of the catalytically active substance. In this manner, the total surface of the filter body on which the soot interacts with the catalytically active substance is increased drastically, resulting in a drastic reduction in the regeneration temperature of the filter body.

Thus, when applying a catalytically active coating on the increased inner surface of the filter body, the regeneration temperature of the filter body may, in suitable embodiments of the invention, be reduced to a temperature as low as 350° C. or even 330° C. or lower.

According to the invention, even a further increase in the surface of the filter body may be obtained by providing a filter body having a relatively larger mean pore size, such as 30–200 µm, that allows the soot particles to penetrate deeper into the wall structure and, thus, interact with the active coating on an even larger surface.

The invention constitutes a considerable improvement compared to known Wall Flow Filters, which are known to build up a soot particle filter cake on the surface only, with very little soot penetration into the structure, resulting in a requirement for regeneration temperatures of at least 400° C.

It is furthermore contemplated that the soot ignition temperature may be lowered considerably with Cu- or Fe-based additives (of types known per se) supplied to and soluble in the diesel fuel as an organo-metallic fluid.

To eliminate the possibility of the soot particles passing through the filter wall, so-called blow-off, a membrane is supplied to the filter wall outlet side. This membrane has a considerably lower pore size than the filter body wall, ensuring a very high filtration efficiency, also when the filter is clean with no filter cake. (Known Wall Flow Filters depend strongly on the filter cake to increase the trapping efficiency from 70–80% with a clean filter to 85–90% with a filter cake partly covering the filtering wall.)

In the filter according to the invention, the provision of a membrane on the filter wall outlet side makes it possible to choose the pore size of the porous sintered filter body so large that part of the soot is not filtered by the filter body but would actually blow through the filter body if the membrane having a smaller pore size were not deposited on the outer surface of the filter body.

Conventionally, a membrane having a pore size smaller than that of the filter body has been deposited on the filter body of known filters for increasing the filtering efficiency of the filter body. Typically, this membrane is required when filtering very small particles, such as dust particles. In the known filter bodies comprising membranes, the membranes are positioned on the gas entrance side of the filtering walls of the filter body. The membrane prevents penetration of the dust into the filter body, as dust particles are not readily removed from the inside of a filter body. It will be appreciated that this arrangement is basically different from the arrangement according to the present invention where the membrane is not used to prevent soot particles from penetrating into the filter body, but is rather used to prevent the soot particles (which are allowed to penetrate into the filter body) from leaving the filter body.

Thus, according to the present invention, a membrane is preferably positioned on the gas outlet side of the filtering wall of the filter body, as penetration of the soot into the filter body is highly desired; this increases the area of the active surface of the filter. In fact, when combining a suitable large pore size and a membrane, the area in which the soot and the catalytically active substance are in contact will be substantially the whole of the inner surface of the filter body in addition to the outer surface of the gas entrance side of the filtering wall of the filter body. In the filter body according to the invention, the membrane solely serves the purpose of allowing a large active contact area and on the same time assuring a suitable, high filtering efficiency of the filter body.

Details about how the membrane can be established are given in the following. It should be understood that it is within the scope of the present invention to establish the "membrane" by means of a gradient of the pore size of the filter body along the thickness of the filter wall, starting with relatively large particles resulting in relative large pores such as, e.g., pores of a size of 35–500 µm and ending with pores which are sufficiently small to ensure that the soot will not leave the filter on the outlet side, such as, e.g., a pore size of 5–10 µm in an intermediary layer and down to a pore size of 0.5–5 µm, such as 1–2 µm, in an outermost layer on the outlet side. It is also possible to have a transition directly from a particle size giving large pores to a particle size giving sufficiently small pores to act as the soot-particle-stopping membrane.

Utilizing the principles of the invention, Wall Flow Filters made by powder technology (e.g., the SiC powder technology disclosed in WO 89/09648; this powder technology is also described in greater detail in the following) can act as a combined surface and depth filters, that is, where part of the particles are allowed to penetrate into the filtering wall, and a membrane on the outlet side of the filter wall, a constant high filtration efficiency is achieved in combination with high contact area between the soot and the catalytically active coating inside the filter's porous internal wall structure.

In addition to lowering the temperature for decomposition of the soot particles, the present invention is also believed to be very important and advantageous in connection with removal of the very small soot particles generated by modern highly efficient diesel engines. These modern diesel engines generate soot particles which are considerably smaller than the soot particles generated by the previous, generations of diesel engines (these previous generations are however, still in use all over the world and will be in use for many years to come). While previous generations of diesel engines typically generated particles between 10 µm and 1 µm, modern diesel engines typically generate particles of sizes in the range of 50 nanometers to 1 µm, in particular in the range of 50 nanometers to 500 nanometers, and an important aspect of the invention relates to the removal of soot particles in this size range using the filter principle according to the invention.

It should be understood that although the filter principle according to the present invention is described particularly in connection with the removal of particles from flue gases, it is contemplated that the principles of the invention may also be useful in connection with the removal of ultrafine particles from other fluids, in particular, but not limited to, gases.

In the following, a more detailed discussion of types of filters, suitable as the filter types to be used in connection with the present invention, is given.

Ceramic filters are often preferred when the process environment contains hot gases with a relatively low oxygen content and the possibility of a relatively high sulphur content.

Silicon carbide has a number of advantages over other materials used in filters, such as oxide ceramics, metals, organic fibres and other ceramics. SiC is long time stable in an oxidising atmosphere up to temperatures as high as 1500° C. Pure, solid SiC has a high physical strength, even at high temperatures. As an example, the strength of solid SiC is 7 times the strength of solid alumina at 1.000° C.

The base material of the powder technology honeycomb filter body is preferably ceramic particles, and will normally have an average mean particle size in the range of 1–250 µm, such as in the range of 10–150 µm, preferably in the range of 30–100 µm, giving filters with pore sizes ranging from 10–200 µm, preferably 20–100 µm, such as 40–80 µm.

If SiC is to be used, 12 commercial grades of SiC are presently the preferred starting products for producing the porous silicon carbide elements, such as Mesh 40, 60, 80, 120, 150, 180, 220, 280, 320, 360, 400, 600 (according to FEPA standards (FEPA: Federation of the European Producers of Abrasives)).

Production methods normally employ continuous barrel/auger extrusion, but also other commonly known ceramic shaping processes, such as tape-casting, iso-static casting, slip-casting and other casting methods may be used.

The presently preferred manufacturing method of the filter bodies is extrusion and sintering of a paste comprising particles of a ceramic and/or metallic material, a permanent binder, one or more green binders and a liquid.

When sintering metallic particles, the outer surface of the particles melt slightly, whereby, after cooling of the sintered body, the sintered body is solidified by the melted metal which solidifies also in menisci in the boundaries between the particles. When using this porous sintered material as a filter body, the holes between the interconnected particles may form the actual pores of the filter body.

Thus, as the particles directly define the porosity of the sintered filter body, the choice of particle size defines the pore size of the sintered material.

In addition, when using particles having a narrow size distribution, the pores of the sintered material will have a narrow distribution, as identical size/shape particles define identical pores.

However, the above "automatic" interconnection of the particles is not seen when sintering e.g. SiC, as SiC does not melt at high temperatures. Instead, SiC disintegrates at a temperature of about 2500° C. Thus, attempting to sinter SiC in the same manner as metals or liquid-sintering ceramics such as Cordierite will result in a pile of SiC powder, a totally dense SiC material or a mixture thereof.

Therefore, when using SiC in the filter body, a permanent binder is preferably incorporated in the paste to be shaped and sintered to form the porous filter body. During sintering, this permanent binder will interconnect the SiC particles and, thus, solidify the filter body in the desired shape and in a manner so that the SiC particles, as described above, directly define the pores of the material.

In a preferred embodiment of the filter body according to the invention, the permanent binder is constituted by small particles of SiC, such as microfine eller ultrafine SiC, e.g. microcrystalline SiC, having a particle size in the interval 0.1–10 µm. This microfine SiC will, due to the evaporation pressure of particles having a small radius of curvature being larger than that of particles having a larger radius of curvature, evaporate or decompose at a temperature where the larger particles are more stable, and solidify among other places in the boundaries of the large SiC particles in the filter body. Thus, the sintered filter body consists of SiC particles, again defining the porosity of the filter body, interconnected by SiC.

This all-SiC filter body is highly preferred, as SiC has superior properties in flue gas filters, and so no other materials having less optimum properties are present in the filter body to reduce the overall properties of the filter body.

Extrusion of a microfine or sub-micron or micro-crystalline powder-based material to a honeycomb monolith or pipes using a pore-forming agent to form the porosity of the filter body is an alternative method for producing structures with a controlled pore size. The pore forming agent will preferably be organic particles of a controlled size in the range of 5–1000 µm, preferably in the range of 10–100 µm. The pore forming agent may be manufactured from various materials, such as combustible or organic materials, such as sawdust, granulated polyurethane powder, a polymer, or carbon powder. When the shaped green body is oxidized, after drying, at high temperature in an oxidizing atmosphere, the pore forming agent will evaporate and, thus, leave pores of a controlled size.

As the filter bodies may be manufactured with a well-defined pore size, the pore size may be chosen depending on the filtering efficiency of the filter body. Thus, depending on requirements for the maximum system weight, the powder-based filter body may be manufactured with relatively thin walls. Especially due to the high mechanical strength of the preferred filter body consisting almost entirely of SiC, thin filtering walls may be obtained. Wall thickness may be 0.5–10 mm, preferably 0.8–2 mm. The cell pitch may be in the interval of 1–25 mm, preferably 2–10 mm.

Also the known manufacturing of foam-casting may be employed for producing an open cell structure where a slurry containing a relatively fine-grained or sub-micron powder is sucked into a polyurethane pre-shaped foam structure. After drying, the pores are formed by the organic material, which is removed during high temperature firing so as to leave behind a ceramic structure, a so-called foam filter, having a variety of interconnected open cells. The slurry will, in addition to some organic binders typically contain powders having sizes of 0.1–50 µm, preferably 1–20 µm. Wall structures of foam filters preferably have 40–160 cells per inch.

SiC, silicon carbide, exists as alfa and beta crystal phases. Depending on the production method, beta SiC may contain residual silicon metal that may react with a precious metal catalytic coating and poison this active coating. However, if non-precious coatings are used, beta SiC-containing silicon metal may be used.

An SiC body fired at temperatures above 2000° C. will mainly consist of pure alfa SiC. Therefore, the alfa type is preferred as raw material. The beta type is not available in grain sizes above 10 µm, but alfa SiC is available in grain sizes ranging from fractions of µm's to several mm's.

If a low strength ceramic material is used in a filter body, such as when using clay-bonded SiC powder, the wall thickness may need adjustment as the sintered material has a lower strength compared to the presently preferred filter body containing SiC. Other ceramic powders, such as $Si_3N_4$, SiONC, alumina, Cordierite, Mullite, Spodurne, members of the Nasicon structural family may be used as the base body structure. The sintering method is simpler for the oxide ceramic bonded ceramics, compared to pure SiC. Cordierite and Nasicon are known for their low coefficients of thermal expansion, making them suitable for filters subjected to large variations in exhaust gas temperature. By the powder technology filter production, combinations of different grain sizes of both permanent binder and coarse substrate grains may easily be achieved giving a wide variety of structures with precisely controlled and desired porosity and pore sizes.

Also metal powder or metal fibre bodies based on iron, chromium, nickel, cobalt, aluminum or manganese as the main ingredient in an alloy could prove useful for specific applications.

A surface-increasing coating may be constituted by small particles bonded to the inner surface of the filter body. If the particles constituting the surface-increasing coating are small compared to the structures of the inner surface, the surface-increasing coating will, e.g., render the inner surface more coarse and, thus, larger due to the small particles defining a large number of "bumps" on the previously more plane surfaces.

The particles to consitute a surface-increasing coating may in a preferred embodiment be introduced in the porous structure of the filter body by manufacturing a slurry containing these small particles and introducing the slurry in the porous structure.

The introduction of a slurry of small colloid particles—called a sol—is preferably done after the firing of the filter body and after removal of residual carbon from the green binder.

When subsequently drying and sintering the filter body, the liquid of the slurry is removed and the small particles are fastened to the inner surface in the porous structure.

In one embodiment, the small particles will be particles which are capable of sintering together and which, due to the sintering, will by themselves adhere to the inner surface of the filter body. Thus, no permanent binder is not required in this case.

A wash coating may be desired between the active coating and the base material structure. The wash coating may be established using known art techniques for applying wash coatings and, as a preferred example, may comprise alumina and/or alumina hydrates and/or mullitization of alumina-silica-gel known to be suitable for increasing the specific surface area considerably, often in the range of 10–1000 times, compared to that of the raw base material, or, expressed in another manner, a surface area from 0.1–100 $m^2$/gram base material. As alumina only changes to low surface alfa-crystal structure at temperatures over 1000° C., the alumina coating in this invention will stay vary stable during regeneration of the filter body, as no low-melting phases are identified even without the use of high-temperature-stabilizing additives.

Furthermore, in the case where the adhesion between the surface-increasing coating and the inner surface material of the filter body is larger than that between the catalytically active coating and the inner surface material of the filter body, the adhesion of the catalytically active coating in the filter body may be increased by the introductions of the surface-increasing coating. In addition hereto, the surface-increasing coating may furthermore provide better adhesion of the membrane material as this material now has a larger number of contact points in the material.

The superior adhesion of the preferred alumina coating to the SiC-based substrate may be due to the formation of a mullite transition layer between the coating and the native silica film on the SiC based substrate.

It may be preferred to further high temperature-stabilizing the alumina in a manner known per se by adding oxides of chromium, wolfram, calcium, strontium, banum, silicon, zirconium, the blend suitably being 80–100% alumina and 0–20% of the above-mentioned additives.

In order to give the wash coat a better bonding on a SiC structure, the filter body is preferably heated in an oxidizing atmosphere for 1–2 hours at calcining temperature, such as about 650° C., in order to remove excess free carbon remaining from the pyrolysis of the green binder and, thus, increase the amount of the protecting $SiO_2$ forming a layer on the SiC grain.

The slurry typically used for applying a surface-increasing coating comprises alumina and additives in water or a salt bath or an acid containing a dispersing agent. The viscosity of the slurry may be adjusted according to the desired penetration into the porous structure of the filter body; this penetration is strongly affected by the average grain size of the substrate. The applied coating is preferably sintered in an oxidizing atmosphere, in the temperature range of 1100–1500° C., preferably 1200–1300° C., depending on the particle size of the alumina and the added sintering agents.

The thickness of the heat treated coating is typically between 0.1 and 100 µm, preferably between 1 and 30 µm, such as between 2 and 10 µm.

As described above, it may be preferred to manufacture a porous filter body having a pore size so large that the filter body alone may not be able to obtain the desired filtering efficiency. In this situation, a membrane having a pore size smaller than that of the filter body may be added to the filter body to increase the filtering efficiency (or may be established by a suitable pore size gradient as mentioned above). As this membrane may be manufactured quite thin, the overall pressure drop over the filter body will not be dramatically increased, however, the filtering efficiency of the filter body may be dramatically increased.

The membrane coating may be very thin, with a thickness from 0.02 to 5 mm preferably from 0.05 to 0.4 mm. The base structure will normally have a mean pore size in the range of 10–300 µm, preferably 20–200 µm, and the membrane will normally have a preferable mean pore size in the range of 1–50 µm, preferably 2–15 µm. A constant separation efficiency as high as 99% for soot can be reached. This will ensure less than 0.05 g/kWh residual soot in the exhaust gas stream downstream of the filter.

A membrane of this type may be manufactured in numerous ways. The overall purpose of the membrane is to decrease the pore size of the filter body in part of the filter body. As described above, the membrane is preferably added to the filter body in a thin layer on the gas exit surface of the filter body. Thus, the membrane should reduce the pore size of a thin layer of the porous structure of the filter body at this surface. This effect may be obtained either by fastening a separate layer having a suitable pore size to this surface or by actually reducing the pores in this part of the filter body.

Membranes of this type may be added to the filter body in a number of ways. However, the presently preferred way of adding the membrane to a filter body is manufacturing a slurry containing the particles or fibres to constitute the membrane, and to pass this slurry through the filter body. If the size of the particles or fibres is chosen correctly depending on the pore size of the pore size of the filter body (which the person skilled in fine powder/fibre technology will be able to do routinely), these particles or fibres will be filtered by the filter body when flowing the slurry through the filter body. If the particles or fibres of the slurry are smaller, such as 1–20 μm smaller, than the mean pore size of the filter body, these particles or fibres will be filtered in the outermost layers of the filter body and thus reduce the pore size of this thin layer of the filter body.

If the slurry is flowed through the filter body in the opposite direction of the flue gas to be filtered by the final filter body, the membrane will be deposited on the flue gas exit surface of the filter body as preferred.

Powder-based membranes are preferably multi-layered coatings having increasing grain size from outside towards the base structure.

Fibre-based membranes may, e.g., have fibre diameter of between 1 and 20 μm. The fibre diameter is preferably between 2–4 μm, and the fibre length may be in the interval 10–10000 μm, preferably 50–1000 μm or 100–500 μm, or it may, for a number of purposes, be between 1 μm and 100 μm, such as between 5 or 10 μm and 50 μm. Where the fibre-based membranes are to be applied to filters of, e.g., honeycomb structure, with narrow channels, it is often suitable to have the fibres of a length of at the most one tenth and more preferred at the most 1/50 or even more preferred at the most 1/100 of the width of the honeycomb channels through which the slurry forming the membrane is passed.

Thus, membranes can be manufactured from powder or fibres or from a combination of both. In many cases, the membranes will be built up in two or more layers by application of slurries of increasing fineness, in accordance with well-known techniques for building up such fine membranes.

Membrane coating is known per se in the industry only on the inlet side of the filter. This known method prohibits the soot from penetrating into the wall structure and achieving the important high surface area contact with the active catalytic coating to promote oxidation.

A catalytically active coating can be placed directly on a wash coat surface in order to act as an oxidation temperature-reducing element. Such coatings are preferably established from a slurry that contains the active material as ultra-fine powder and the carrier as water or an organic, a salt, acid or non-organic solution. However, also substances soluble in a liquid may be used for the deposition of the catalytically active coating.

The catalytically active material may, e.g., be selected from platinum, palladium, rhodium, vanadium, titanium, zirconium, copper, nickel or in any combined form as well as, for each selected active elements or for some of them, in chemical combinations/compounds with oxygen, nitrogen, etc. The active substance may be soluble in a fluid and the fluid may be flushed through the substrate to a given weight increase corresponding to a desired layer thickness. The amount of catalytically active material is normally from 0.1–10 gram/liter filter substrate, preferably between 0.5 and 5 gram/liter such as 1–3 gram/liter.

The catalytically active coating is, as is also the case of the surface-increasing coating, suitably added to the filter body by introducing the slurry/solution in the filter body and subsequently removing the liquid. However, also other known methods of application of catalytically active elements on the surfaces of the filter, including the very important interior surfaces, may be used, such as PVD techniques, etc. It will also be understood that while a wash coating is often preferred, there may be interesting combinations of filter material, such as SiC, and catalytically active coatings where no wash coating may be required to obtain the desired effective deterioration, in particular by oxidation, of the soot particles.

BRIEF DESCRIPTION OF THE DRAWINGS

The invention will now be described by a non-limiting number of figures and examples. In the following, FIG. 1A shows the porosity structure of a filter body of the Cordierite type, FIG. 1B illustrates the small number of open and, thus, useful pores on the surface on the filter body shown in FIG. 1A, FIG. 2A shows the porosity structure of a filter body of the type described in PCT publication No. WO 89/09648, FIG. 2B illustrates the large number of open and, thus, useful pores on the surface on the filter body shown in FIG. 2A, FIG. 3 illustrates a catalytically active coating on a filter body of the type shown in FIG. 1A.

FIG. 1A shows a filter body 1 of the same type as Cordierite Wall Flow Filters which, by it's nature, has a relatively low permeability caused by a large amount of uncontrolled pores, that often become blind cavities 3 and therefore, are of little use. The pores in this type of material are mainly created by a chemical reaction taking place during the sintering process, and not the packing relatively large grains together during the extrusion as is the case in the filter body described in PCT publication no. WO 89/09648. This pore creation method is impossible to control to a higher degree of precision. SEM (Scanning Electron Microscope) investigations show low numbers of open and useful pores 5 per unit surface area.

FIG. 1B illustrates the number of open and useful pores 5 on the surface of the filter body 1 seen in FIG. 1A.

In FIG. 2 a powder technology based wall flow filter body 8 is seen. This type of filter body 10 has an improved permeability compared to the type of filter body 1 seen in FIGS. 1A, 1B due to a controlled pore size creation during manufacturing. Typically, the permeability of this filter body is 30–50% higher is compared to non powder technology based Wall Flow Filters, such as the filter body 1 seen in FIGS. 1A, 1B, as the particles 10 constituting this filter body 8 have the same size and the contact points 12 connect all the particles 10 together only at the contact points 12. SEM investigations show a large number of open and useful pores 14, typically, this number is twice that of the filter body 1 seen in FIGS. 1A, 1B.

FIG. 2B illustrates the number of open and useful pores 14 on the surface of the filter body 8 seen in FIG. 2A.

In FIG. 3, the position of a catalytically active coating 7 on filter body 1 as seen in FIG. 1 is seen. No surface-increasing coat is applied on this filter body 1. By measuring the pressure drop over the filter body 1 before and after the coating 7 is applied, it is discovered that the pressure drop increases significantly, indicating that the pores 5 in the filter body 1 decrease in size and that some pores 5 may be filled and blocked by the coating 7 (see position 9 in FIG. 3).

In FIG. 4 the position of a catalytically active coating 16 on a powder technology based filter body 8 as seen in FIG. 2A is seen. This coating 16 may be positioned on top of a surface-increasing coating. Both these coatings cover every particle in the filter body with a controlled layer thickness so that no pores in the filter body 8 is blocked. No increase in pressure drop is measured when only the surface-increasing coating is applied.

FIG. 5 shows a preferred embodiment of a membrane 20 on a filter body as seen in FIG. 2A. Preferably, the membrane 20 is added to the gas outlet side 22 of the filter body 8. To be optimally efficient, the membrane 20 preferably covers the complete down stream, outlet side 22 surface of the filter body 8. In this figure, the membrane 20 is formed by a number of particles 21, which are positioned in the outer parts of the gas outlet side 22 of the filter body. In an other preferred embodiment, the membrane 20 may consist of a multi layer type with increasing pore size towards to the base structure of the filter body 8. The membrane 20 preferably only covers the outlet side 22. In operation, the gas flow, including the soot, enters the open porosity of the filter body 8 and penetrates into the wall until it is slightly restricted for further penetration through the filter body 8 by the membrane 20.

FIG. 6. In a conventional diesel engine soot filter monolith the porous filter wall or filter body 1 receives the gas flow 4 in one direction and accumulates the soot/carbon particles 2 on the top surface of the monolith wall, characterised as a soot cake with a well-defined boundary within the filter material itself. The soot layer or soot/carbon particles 2 starts combustion in the very thin boundary layer 6 only with intimate contact with the catalytic active coating and a sufficient temperature. Within the narrow combustion zone carbon monoxide is generated as a result of the combustion and at the same time the oxygen concentration is reduced. Both gases follow the flow direction 4a and are expelled through the exhaust system. The heat generated by the combustion follows direction 4a and the distance from the combustion zone 3 to the unburned soot increases fast. With reduced oxygen levels and lack of unburned soot the combustion slows down. The otherwise intimate contact between the filter wall and soot cake converts into a distance or interval which destroys the necessary contact between the catalytic active coating and soot. The result is the combustion speed being reduced/stopped because of lack of catalytic active coating contact, heat, etc.

FIG. 7. This invention relies on an very open filter structure, where the gas flow 4 tries to pass the soot particles 2 through with low filtration efficiency. As no well-defined soot cake is generated the soot penetrates into the filter wall and there is no well-defined combustion zone. The combustion takes place inside the filter wall itself, or the combustion zone is on the very grain surface and creates a boundary layer with now same thickness as the filter wall. The boundary layer is only well-defined relative to each wall grain surface and not to the filter wall surface. The membrane 20 on the filter wall outlet side ensures that the trapping efficiency is kept high.

Figure 4:
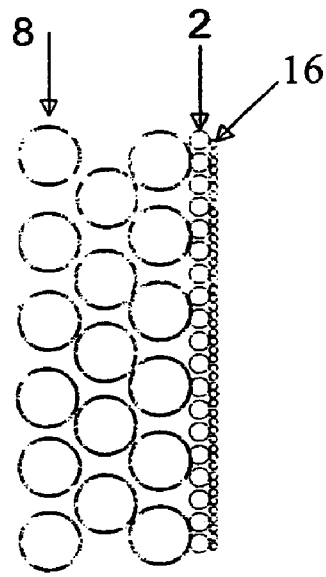
FIG. 4 illustrates a catalytically active coating on a filter body of the type shown in FIG. 2A.
Figure 5:
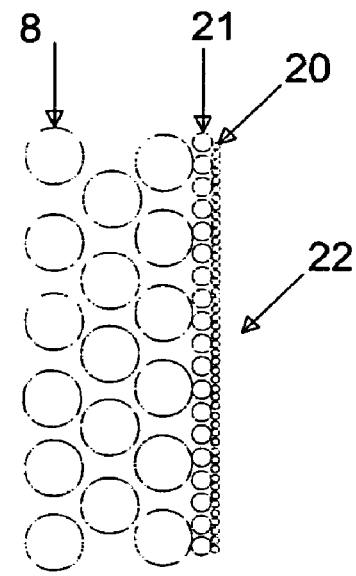
FIG. 5 illustrates the preferred position of a membrane positioned on the filter body shown in FIG. 2A.
Figure 6:
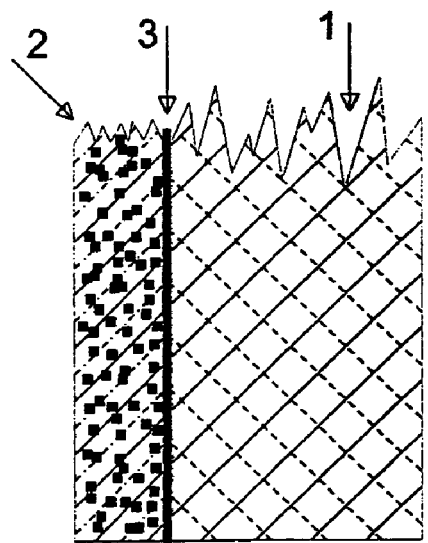
FIG. 6 illustrates a conventional diesel engine soot filter monolith with porous walls.
Figure 7:
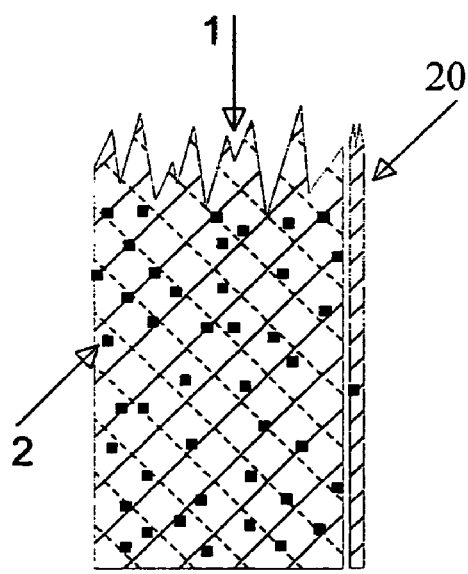
FIG. 7 illustrates an open filter structure according to the invention.

The following examples illustrate in greater detail various ways in which the filter systems/structures according to the invention may be made

EXAMPLE 1

Silicon carbide powder technology substrates may be manufactured using a continuous extrusion process. The compound may be composed of 69–72 wt % inexpensive, commercially available, large size Mesh 180 SIKA I grinding grain or powder size 75–105 µm from Arendal in Norway and 4–13 wt % ultra fine SiC, mixed into a plastic paste composed of 4–6 wt % Methyl Cellulose from Hoechst, 8–25 wt % water and 0–12 wt % ethanol.

The paste may be extruded in a water cooled single screw auger extruder with vacuum chamber, into a honeycomb die head. Extrusion speed may be from 1.5–2 meters per minute.

After a very high temperature sintering process, typically at a temperature above 2200° C., in a protective atmosphere, such as Argon, the structure becomes a low density, rigid and highly porous filter body.

The preferred shape of the filter body is at present the so-called honeycomb structure.

This filter design has a matrix of thin, interconnected walls which define a multiplicity of cells and which have interconnected open pores of very controlled size. The porosity is high and sufficient to enable the fluid/gas to flow completely through the thin walls in their narrow dimensions, between adjoining cells and through the thin walls in their longer dimensions between adjoining or neighbouring cells and to substantially restrict the particles in the gas from flowing through the filter body. Each channel is closed in one end and neighbouring channels are closed at alternate ends, forming a chess-board like pattern, generating a Wall Flow Filter.

The properties of the SiC (silicon carbide) based filter material are characterised by an extremely high thermal conductivity (10–30 W/m$^2$K), giving a very high thermal shock resistance. SiC decomposing point is around 700° C. higher than melting point for Cordierite (1300° C.). Expansion of SiC is 3.5–4×10$^{-6}$/K.

The high strength is obtained as the result of the ultra-fine SiC powder evaporating at the high sintering temperature and condensing in the grain contact points between the larger Mesh 180 grain. By this method, the structure becomes pure SiC.

Wall Flow Filters produced from a powder having a very controlled grain size are characterised by an extremely homogeneous and controlled pore size and pore size distribution. A pore size measured to be 50 my, gives a filtration efficiency, without a membrane, measured to be higher than 65%. The permeability is about 50% higher than that of a Corning Cordierite EX-66 structure having a filtration efficiency of approximately 70–80%.

The applied wash coat may consist of an alumina/water slurry with added dispersing agents. As alumina powder source, Alcoa A16-sg (particle size: 40–80% within Mesh 200, corresponding to about 63 µm, surface area 5 m$^2$/g, green density 2.12 g/cm$^3$, analysis 99.8% pure Al$_2$O$_3$) can be used. A commercially available dispersing agent, such as DARVA C or Dispex from R. T. Van der Bilt CO, Int. may be used. The coating may be applied by two different methods as described here: A slurry with a relatively low alumina content can be used when the coat is applied simply by filling up the filter body with the slurry. Excess slurry is decantered off. The alumina content in the slurries used is in the range of 55–70% by weight. The coat can be applied by the use of vacuum or compressed air. The filter is filled with a slurry containing 65–80% alumina by weight. The excess slurry is driven out by applying vacuum or compressed air to one end of the substrate. The applied wash coat may be sintered in an oxidizing atmosphere in the temperature range of 1100–1500° C., preferably at 1200° C., for 1 hour.

A fibre membrane coating may be deposited in a very thin layer: 0,01–1 mm, preferably 0.05–0.2 mm, and with a mean pore size in the range of 2–20 µm, such as 5–10 µm. A separation efficiency as high as 95–99% for soot can be reached. The fibres used may be Almax alumina fibers, but also a wide variety of other fibers can be used. The dimensions of the fibers used may be: 10 µm diameter and 500 µm fiber length, but as mentioned above, the fibres will preferably be small, such as with a length of 1/50–1/100 of the channel width. A slurry containing Alcoa A16 sg alumina powder and Almax fibers in the ratio 0.1–5, preferably 0.2–0.5, may be applied by the same techniques as used in the application of wash coats. The slurry may be dispersed by the use of commercial dispersing agents, such as the above-mentioned dispersing agents. As a binding agent, 4–7 wt % Methyl Cellulose from Hoechst may be used. The coatings may be sintered in an oxidizing atmosphere in the temperature range 1300–1500° C., preferably 1350–1450° C.

Alternatively a granule coating consisting of alumina/SiC can be used instead of the fiber based coating. The thickness of this membrane may be 0.01–1 mm, such as 0.05–0.15 mm. The alumina content may, as before, be Alcoa A16 sg. As structural elements, commercial grades of SiC, such as Mesh 360, 400, 600 and 800 may beused. Preferably, Mesh grade 400 and 600 are used. Alumina/SiC ratio may be in the range 0.01–5 preferably 0.15–0.35. Commercially available dispersing agents may be used, such as the above-mentioned dispersing agents. As binding agent 4–6 wt % Methyl Cellulose MH-300 from Hoechst may be used. The coating may be applied as mentioned above. The coat is sintered in an oxidising environment in the temperature range of 1100–1500° C. preferably 1200–1300° C.

Generally, the thickness of the applied membrane will depend on the porosity and inner structure of the porous filter body to receive the membrane.

A catalytically active coating may be placed directly on the wash coat surface in order to act as an oxidation temperature reducing element. This coating may be deposited as a slurry containing the active material as submicron or ultra fine powder and the carrier may be water as a non-organic solution.

The catalytically active material may be from the platinum element group. The active substance may be soluble in a fluid and the fluid being flushed through the substrate to a given weight increase. The amount of catalytically active material may, e.g., give a weight increase of 3 gram/liter substrate.

All finished filter parts are filled into cylindrical stainless steel containers, and all adjoining faces held apart with Interam X-D heat expanding Vermiculite-based insulation material from the company 3M. The Interam end faces toward the gas flow is erosion protected by Inconel wire mesh. It is, however, contemplated that Saffil Al$_2$O$_3$ fibres from ICI in UK, processed to a 15 mm thick needle felt, might also be used, possibly without needing the wire mesh protection.

It is contemplated that the complete diesel filter will have a constant trapping efficiency of at least 98% and a considerably lower pressure drop than known systems having the same pressure drop. The regeneration temperature of this filter is envisaged to be of the order of 100° C. lower than systems known per se.

EXAMPLE 2

A series of different oxide-based ceramic substrates may be manufactured from Cordierite, Spodumene and Mullite compositions after similar methods. The ceramic precursors are listed in Table 1.

TABLE 1

| Ceramic precursors. wt % | | | |
|---|---|---|---|
| | Mix A Cordierite | Mix B Spodumene | Mix C Mullite |
| China Clay gr. E (APS 2–3) | 40.4 | 65.8 | 51.5 |
| Talc (APS 1–4) | 43.6 | — | — |
| Al$_2$O$_3$CT 3000 SG (APS 0.4–0.6) | 16.0 | — | 48.5 |
| SiO$_2$ Fyleverken (APS 3–6) | — | 15.3 | — |
| Li$_2$CO$_3$ anal. qual. (APS 3–6) | — | 18.9 | — |

As binder/plasticiser, a methyl-hydroxy-ethyl-cellulose may be used (Tylose MH 300 P from Hoechst). In the case of Cordierite and Spodumene ceramics the precursors may be calcinated/sintered to a grog and crushed into a coarse grained partly porous powder with a particle size similar to FEPA Mesh 180. The green body compounds may be composed according to Table 2 and mixed dry for 30 min. Ethanol is added and after another 10 min of mixing the water is introduced. Another 30 min. of mixing remains. As a pore-forming agent, a filler of polystyrene spheres (Shell N 2000) is added along with the dry raw materials. Selected size fractions of 30–50 µm are used. The spheres will pack to a dry tap porosity of 40 vol % which will result in a max. filler/compound ratio of 0.68.

The compound is extruded in a single screw auger extruder with vacuum chamber, into the die head. The extruded bodies are dried at ambient temperature and controlled humidity and sintered in an electrical furnace with normal atmosphere according to Table 2.

TABLE 2

| Green body compounds. | | | |
|---|---|---|---|
| | Cordierite wt % | Spodumene wt % | Mullite wt % |
| Mix A | 46.5 | — | — |
| Mix B | — | 48.5 | — |
| Mix C | — | — | 73.7 |
| Tylose | 8.6 | 9.0 | 0.7 |
| Water | 15.7 | 11.1 | 19.0 |
| Ethanol | 29.2 | 31.4 | 6.7 |
| Filler/Compound (vol/vol) | 56–64 | 58–62 | 58–64 |
| Sintering temp. ° C. | 1340 | 1270 | 1400 |
| Linear shrinkage % | 5.4 | 6.7 | 7.1 |

The structure becomes a low density, rigid and highly porous filter element. The pores have controlled pore size and the material has good properties for a further coating and addition of a membrane to optimise the high efficiency soot filter for diesel engines.

A wash coat is deposited as described in example 1.

The fibre membrane coating is very thin, 0.05–0.2 mm thick and has a mean pore size in the range of 5–10 µm. It is envisaged that a separation efficiency as high as 95–99% for soot can be reached. The fibres used are Almax alumina fibers. The dimensions of these fibers may be: 10 µm diameter and 0.5 mm fiber length, but as mentioned above, shorter fibres are highly preferred. A slurry containing Alcoa A16 sg alumina powder and Almax fibers in the ratio 0.1–5, preferably 0.2–0.5 was applied by the same techniques as used in the application of wash coats. The slurry se dispersed by the use of commercial dispersing agents. As binding agent 4–7 wt % Methyl Cellulose from Hoechst is used. The coatings are sintered in oxidizing atmospheres in the temperature range 1300–1500° C., preferably 1350–1450° C.

An active coating is applied as in example 1.

EXAMPLE 3

A series of different oxide-based ceramic powder technology substrates are manufactured from Cordierite, Spodumene and Mullite compositions after similar methods. The ceramic precursors are listed in Table 3.

TABLE 3

| Ceramic precursors. wt % | | | |
|---|---|---|---|
| | Mix A Cordierite | Mix B Spodumene | Mix C Mullite |
| China Clay grade E (APS 2–3) | 40.4 | 65.8 | 51.5 |
| Talc (APS 1–4) | 43.6 | — | — |
| Al$_2$O$_3$CT 3000 SG (APS 0.4–0.6) | 16.0 | — | 48.5 |
| SiO$_2$ Fyleverken (APS 3–6) | — | 15.3 | — |
| Li$_2$CO$_3$ anal. qual. (APS 3–6) | — | 18.9 | — |

As binder/plasticiser, a methyl-hydroxy-ethyl-cellulose is used (Tylose MH 300 P from Hoechst). In the case of Cordierite and Spodumene ceramics the precursors are calcined/sintered to a grog and crushed into a coarse grained partly porous powder with a particle size similar to FEPA Mesh 80. 1–20% ultra fine powder from the same material is added in a ratio of between 20:1 to 6:1. The green body compounds are composed according to Table 4 and mixed dry for 30 min. Ethanol is added and after another 10 min of mixing the water is introduced. Another 30 min. of mixing remains.

The compound is extruded in a single screw auger extruder with vacuum chamber, into the honeycomb die head. The extruded bodies were dried at ambient temperature and controlled humidity and precision sintered in an electrical furnace between 10 and 400 minutes with normal oxidizing atmosphere according to Table 4.

TABLE 4

| Green body compounds. | | | |
|---|---|---|---|
| | Cordierite wt % | Spodumene wt % | Mullite wt % |
| Mix A | 75.5 | — | — |
| Mix B | — | 68.5 | — |
| Mix C | — | — | 73.7 |
| Tylose | 8.6 | 9.0 | 0.7 |

TABLE 4-continued

| Green body compounds. | | | |
|---|---|---|---|
| | Cordierite wt % | Spodumene wt % | Mullite wt % |
| Water | 12.7 | 11.1 | 19.0 |
| Ethanol | 3.2 | 11.4 | 6.7 |
| Appr. sintering temp. ° C. | 1330 | 1230 | 1350 |
| Linear shrinkage % | 4.4 | 5.7 | 6.1 |

The structures become a low density, relatively rigid but highly porous filter element with the important, very controlled pore size and distribution for maximum and high permeability made possible by the powder technology.

An acceptable strength of the filter body is obtained, as the ultra fine powder binds in the contacts point from or between the larger Mesh 80 grain. The structure by this method becomes a pure material.

The wash coat is applied in the same manner as described in example 1.

The fibre membrane coating is very thin, a 0.05–0.2 mm thick membrane with mean pore size in the range of 5–10 µm. A separation efficiency as high as 95–99% for soot can be reached. The fibres used are Almax alumina fibers. The dimensions of these fibers may be: 10 µm diameter and 0.5 mm fiber length, but as mentioned above, it may be preferred to use considerably shorter fibres, such as fibres of a length of at the most 100 µm. A slurry containing Alcoa A16 sg alumina powder and Almax fibers in the ratio 0.1–5, preferably 0.2–0.5, is applied by the same technique as used in the application of wash coats. The slurry is dispersed by the use of commercial dispersing agents. As binding agent 4–7 wt % Methyl Cellulose from Hoechst is used. The coatings are sintered in oxidizing atmospheres in the temperature range 1300–1500° C., preferably 1350–1450° C.

An active coating is applied as in example 1.

In all of the examples, the filter device becomes, by way of this new technique, an ultra high-flow exhaust gas filter with previously unattained low regeneration temperatures for the captured diesel soot, providing an uncomplicated, low cost alternative to reducing soot emissions from diesel powered vehicles. It is known by the experienced person skilled in the art of ceramics and fine powder/fibre technology that the methods disclosed can be varied in many ways and still result in the novel structures and methods disclosed herein.

The invention claimed is:

1. In a porous filter body for filtering soot particles from diesel engine exhaust gases, the filter body being a honeycomb wall flow filter body in which interconnected porous filter walls, each of which has a gas inlet surface and a gas outlet surface, define a multiplicity of channels, each channel being closed at one end and neighbouring channels being closed at alternate ends, the filter walls being made of a material based on metallic and/or ceramic particles being bonded together, the porosity of the filter wall being constituted by interconnected voids defined between the metallic and/or ceramic particles, the particles directly defining the pores of the material, the improvement wherein:

the filter body has a mean pore size in the range of 30–200 µm for allowing the intrusion of soot particles;

a catalytically active material catalyzing oxidation of soot is deposited on at least part of those surface parts of the metallic and/or ceramic particles which are exposed to the voids, and a porous membrane having a mean pore size in the range of 1–50 μm and a thickness in the range of 0.05–0.4 mm is applied to the gas outlet side only of the filter walls.

2. A filter body according to claim 1, wherein the filter walls are made of SiC particles bonded together.

3. A filter body according to claim 1 wherein the material of the filter walls is coated with a coating to increase the active contact surface area of the filter body and act as an anchor for the catalytically active material.

4. A filter body according to claim 3, wherein the surface-increasing coating is constituted by particles bonded to the particles on which the material of the filter walls is based.

5. A filter body according to claim 3 wherein the surface-increasing coating is an alumina wash coat.

6. A filter body according to claim 5, wherein the alumina wash coat is stabilized by means of additives comprising elements from group I–VI.

7. A filter body according to claim 1 wherein the filter walls are coated with a coating to increase the actual surface area of the filter walls structure and coated with a catalytically active coating based on metals as Ru, Rh, Pt, Pd, Ir, Ni, Cu, V, W, Y, Ce, Ti, Zi or combinations hereof or oxides hereof.

8. A filter body according to claim 1 wherein the ceramic and/or metal particles on which the material of the filter wall is based have a particle size in the interval 1–250 μm.

9. A filter body according to claim 8, wherein the ceramic and/or metal particles on which the material of the filter wall is based have a particle size in the interval 10–150 μm.

10. A filter body according to claim 1, wherein the pores of the filter walls have a mean pore size in the interval of 40–80 μm.

11. A filter body according to claim 1 wherein the porosity of the filter walls is in the interval of 30–90%.

12. A filter body according to claim 1 wherein the porous membrane applied to the gas outlet side of the filter walls is constituted by metallic and/or ceramic particles and/or fibers.

13. A filter body according to claim 12, wherein the size of the particles and/or fibres is smaller than the pore size of the material of the filter walls.

14. A filter body according to claim 1 wherein the mean pore size of the porous membrane applied to the gas outlet side of the filter walls is in the interval of 2–15 μm.

* * * * *

UNITED STATES PATENT AND TRADEMARK OFFICE
CERTIFICATE OF CORRECTION

| | | |
|---|---|---|
| PATENT NO. | : 7,179,430 B1 | Page 1 of 1 |
| APPLICATION NO. | : 09/743096 | |
| DATED | : February 20, 2007 | |
| INVENTOR(S) | : Per Stobbe et al. | |

It is certified that error appears in the above-identified patent and that said Letters Patent is hereby corrected as shown below:

Title page, item [75] Inventor: Jakob Weiland Hoi should be Jakob Weiland Hoj

Signed and Sealed this

Twelfth Day of June, 2007

JON W. DUDAS
*Director of the United States Patent and Trademark Office*